(12) United States Patent
Ishifuro et al.

(10) Patent No.: US 12,106,000 B2
(45) Date of Patent: Oct. 1, 2024

(54) PRINTED MATERIAL PRODUCTION SYSTEM, PRINTING METHOD, AND NON-TRANSITORY COMPUTER-READABLE STORAGE MEDIUM STORING PRINTED MATERIAL PRODUCTION PROGRAM

(71) Applicant: SEIKO EPSON CORPORATION, Tokyo (JP)

(72) Inventors: Yuko Ishifuro, Nagano (JP); Yuto Fukuchi, Nagano (JP); Yuka Kobayashi, Nagano (JP); Ayako Kobayashi, Nagano (JP); Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/494,809

(22) Filed: Oct. 26, 2023

(65) Prior Publication Data

US 2024/0143252 A1 May 2, 2024

(30) Foreign Application Priority Data

Oct. 28, 2022 (JP) ................... 2022-173040

(51) Int. Cl.
  *G06F 3/12* (2006.01)
  *G06K 15/02* (2006.01)
(52) U.S. Cl.
  CPC .......... *G06F 3/1256* (2013.01); *G06F 3/1207* (2013.01); *G06F 3/1272* (2013.01); *G06K 15/021* (2013.01)

(58) Field of Classification Search
  CPC .... G06F 3/1256; G06F 3/1207; G06F 3/1272; G06K 15/021
  See application file for complete search history.

(56) References Cited

U.S. PATENT DOCUMENTS

| | | | |
|---|---|---|---|
| 2017/0265515 A1* | 9/2017 | Davila | A23P 20/20 |
| 2017/0368755 A1* | 12/2017 | Bader | B33Y 50/02 |
| 2018/0225867 A1* | 8/2018 | Goel | G06V 10/763 |
| 2019/0364157 A1* | 11/2019 | Ohta | H04N 1/00915 |
| 2021/0370685 A1 | 12/2021 | Endo | |

FOREIGN PATENT DOCUMENTS

| | | |
|---|---|---|
| JP | 2021-187025 A | 12/2021 |
| JP | 2022-039737 A | 3/2022 |

* cited by examiner

*Primary Examiner* — Iriana Cruz
(74) *Attorney, Agent, or Firm* — Global IP Counselors, LLP

(57) ABSTRACT

A printed material production system includes: a reception section configured to receive an order of a printed material; when the order includes production of the three-dimensional printed material, an output section configured to output a first preview indicating a plurality of faces of the three-dimensional printed material after printing; and a production section configured to print in accordance with the order to produce the three-dimensional printed material.

5 Claims, 12 Drawing Sheets

FIG. 10

| \ | ORDER SHEET | | |
|---|---|---|---|
| ORDER No. A001 | | | |

| SCHEDULED DELIVERY | RECEPTION | PAYMENT | DELIVERY |
|---|---|---|---|
| | | | |

| NAME | CONTACT ADDRESS |
|---|---|
| | |

| NUMBER | PRODUCT NAME | QUANTITY |
|---|---|---|
| 1 | MUG M WHITE | 1 |
| 3 | SNAPSHOT, L SIZE, NO EDGE | 40 |

FIG. 11
| ORDER SHEET | | | |
|---|---|---|---|
| ORDER No. A001 | | | |
| SCHEDULED DELIVERY | RECEPTION | PAYMENT | DELIVERY |
|  |  |  |  |
| NAME | CONTACT ADDRESS | | |
|  |  | | |
| NUMBER | PRODUCT NAME | | QUANTITY |
|---|---|---|---|
| 1 | 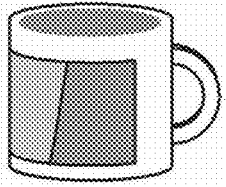 | MUG M WHITE | 1 |
| 2 | 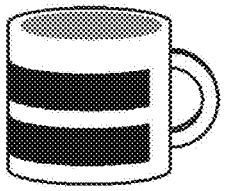 | MUG M WHITE | 1 |
| 3 | 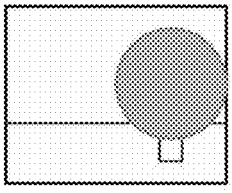 | SNAPSHOT, L SIZE, NO EDGE | 40 |

FIG. 12

| NUMBER | PRODUCT NAME | QUANTITY |
|---|---|---|
| | ORDER SHEET | |
| | ORDER No. A001 | |
| 1 | MUG M WHITE | 1 |
| 2 | MUG M WHITE | 1 |

PRINTED MATERIAL PRODUCTION SYSTEM, PRINTING METHOD, AND NON-TRANSITORY COMPUTER-READABLE STORAGE MEDIUM STORING PRINTED MATERIAL PRODUCTION PROGRAM

The present application is based on, and claims priority from JP Application Serial Number 2022-173040, filed Oct. 28, 2022, the disclosure of which is hereby incorporated by reference herein in its entirety.

BACKGROUND

1. Technical Field

The present disclosure relates to a printed material production system, a printing method, and a non-transitory computer-readable storage medium storing a printed material production program.

2. Related Art

Techniques for printing on various media are known. For example, JP-A-2022-39737 discloses a printer that prints an image on a can body.

A technique that enables a user to easily have an idea of a completed printed material when an image is formed on a three-dimensional medium is desired.

SUMMARY

According to an aspect of the present disclosure, there is provided a printed material production system including: a reception section configured to receive an order of a printed material; when the order includes production of the three-dimensional printed material, an output section configured to output a first preview indicating views seen from a plurality of directions of the three-dimensional printed material after printing; and a production section configured to print in accordance with the order to produce the three-dimensional printed material.

According to another aspect of the present disclosure, there is provided a printing method including: receiving an order of a printed material; when the order includes production of the three-dimensional printed material, outputting a first preview indicating views seen from a plurality of directions of the three-dimensional printed material after printing; and printing in accordance with the order.

According to still another aspect of the present disclosure, there is provided a non-transitory computer-readable storage medium storing a program, the program causing a computer to perform functions including: a reception section configured to receive an order of a printed material; when the order includes production of the three-dimensional printed material, an output section configured to output a first preview indicating views seen from a plurality of directions of the three-dimensional printed material after printing; and a production section configured to print in accordance with the order to produce the three-dimensional printed material.

BRIEF DESCRIPTION OF THE DRAWINGS

FIG. 10 is a diagram illustrating an example of an order sheet.

FIG. 11 is a diagram illustrating an example of an order sheet.

FIG. 12 is a diagram illustrating an example of an order sheet.

DESCRIPTION OF EMBODIMENTS

A description will be given of embodiments of the present disclosure in the following order.

1. Configuration of Printed Material Production System
1.1 Customer Terminal Configuration
1.2 Staff Terminal Configuration
1.3 Server Configuration
1.4 Print Control Terminal Configuration
2. Printed Material Production Processing
3. Other Embodiments

1. Configuration of Printed Material Production System

Figure 1:
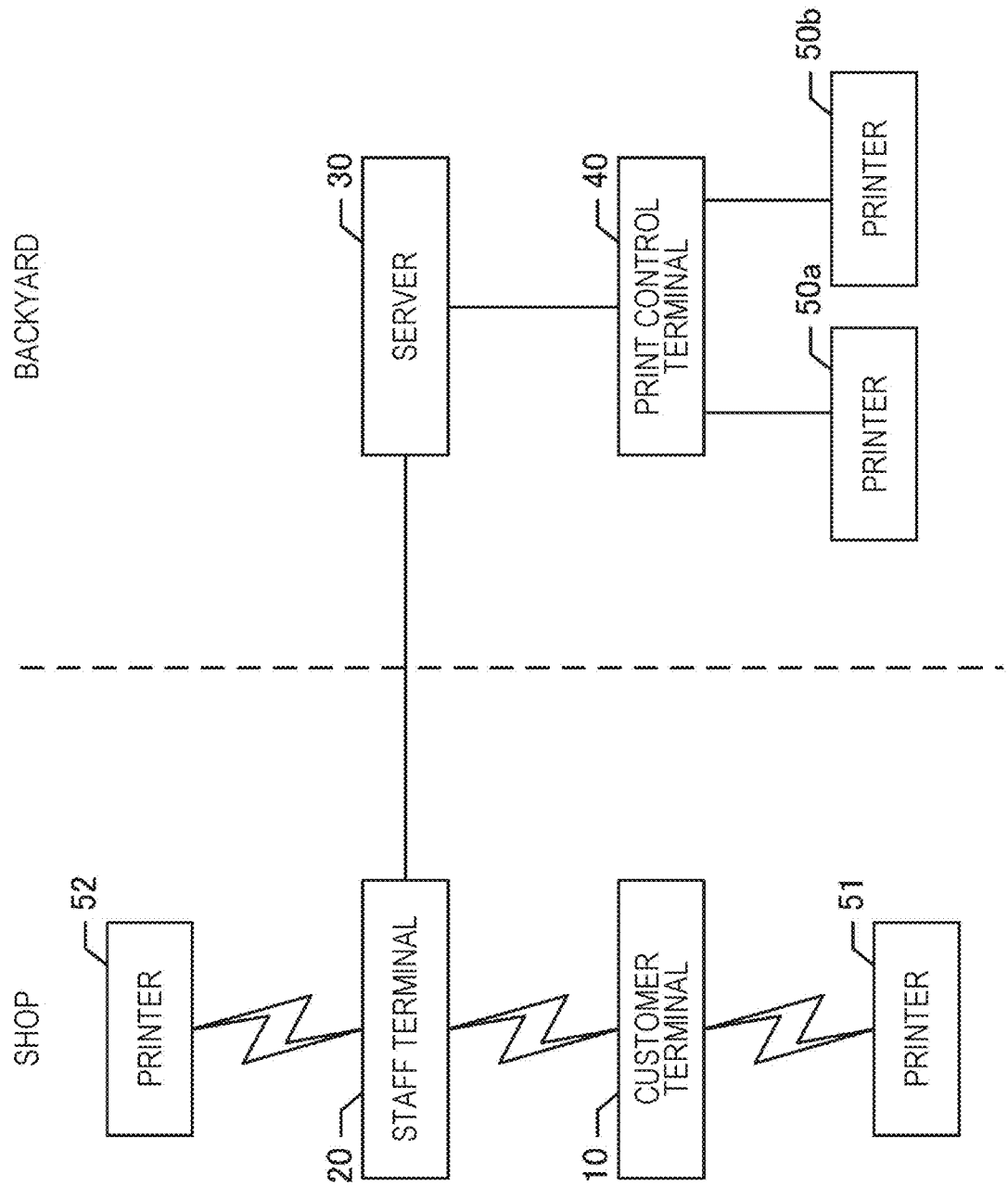
FIG. 1 is a block diagram illustrating a printed material production system.

FIG. 1 is a diagram schematically illustrating an example of a printed material production system according to an embodiment of the present disclosure. The printed material production system 1 includes a customer terminal 10, a staff terminal 20, a server 30, and a print control terminal 40. Also, the customer terminal 10, the staff terminal 20, and the print control terminal 40 are coupled with printers 51, 52, and 50a and 50b respectively, which are configured to perform printing by receiving print instructions from the corresponding terminals. The number of devices illustrated in FIG. 1 is an example and is not limited. For example, the number of the plural printers 50a and 50b may be larger or smaller. The customer terminal 10, the staff terminal 20, the printer 51, and the printer 52, and the like, each of which is described as one device, may each be provided in plural.

These devices are able to communicate with each other via various types of network. For example, in the present embodiment, it is assumed that the customer terminal 10 performs wireless communication with the staff terminal 20 and the printer 51, and the staff terminal 20 performs wireless communication with the customer terminal and the printer 52, and performs wired communication with the server 30. However, the types of network are not limited to the types described above.

In the present embodiment, the printed material production system is used when a printed material is produced in accordance with an order from a customer. In the present embodiment, the customer terminal 10, the staff terminal 20, and the printers 51 and 52 are installed at a shopfront where reception of an order and the like is performed. On the other hand, the server 30, the print control terminal 40, and the printers 50a and 50b are installed in a backyard different from the shopfront. The backyard may be located at a place connected to the shopfront or at a remote place, such as a printing factory or the like.

In the present embodiment, a customer places a purchase order by using the customer terminal 10 installed at a shopfront. A staff member at the shopfront confirms and settles the order by using the staff terminal 20. Print data generated in accordance with the order is transmitted to the server 30. The server 30 stores the print data and performs progress management of printing based on the print data. In the backyard, a print worker performs printing in accordance with the order of the customer by using the print control terminal 40.

The type of a printed material produced in accordance with an order is not limited, and, in the present embodiment, an example in which printing is performed on a three-dimensional medium (a mug, a smartphone case, and the like) and a planar medium so as to produce a printed material is assumed. Accordingly, for the printers 50a and 50b, facilities that enable to produce a three-dimensional medium and a planar medium are provided. The types of the printers 50a and 50b are not limited. Here, an example in which the printer 50a includes a sublimation transfer method printer and a press machine (for example, a mug-press machine for transforming an image onto the surface of a cylindrical object, such as a mug or the like, a press machine for transferring an image onto a smartphone cover or the like) for sublimation transferring an image printed on sublimation transfer paper is assumed. Forming an image on a three-dimensional medium may be realized by transferring as in the present embodiment or by direct printing by using a robot arm or the like.

An example in which the printer 50b is a printer that prints on planar print paper is assumed. In the present embodiment, the printers 51 and 52 are also printers that print on planar print paper. The printer 51 is, for example, a document printer that prints a receipt indicating an order number for identifying an order placed by a customer or the like. The printer 52 is, for example, a document printer that prints an order sheet indicating order contents to a customer or the like.

In the following, a description will be given of each device included in the printed material production system 1 described above.

1.1 Customer Terminal Configuration

Figure 2:
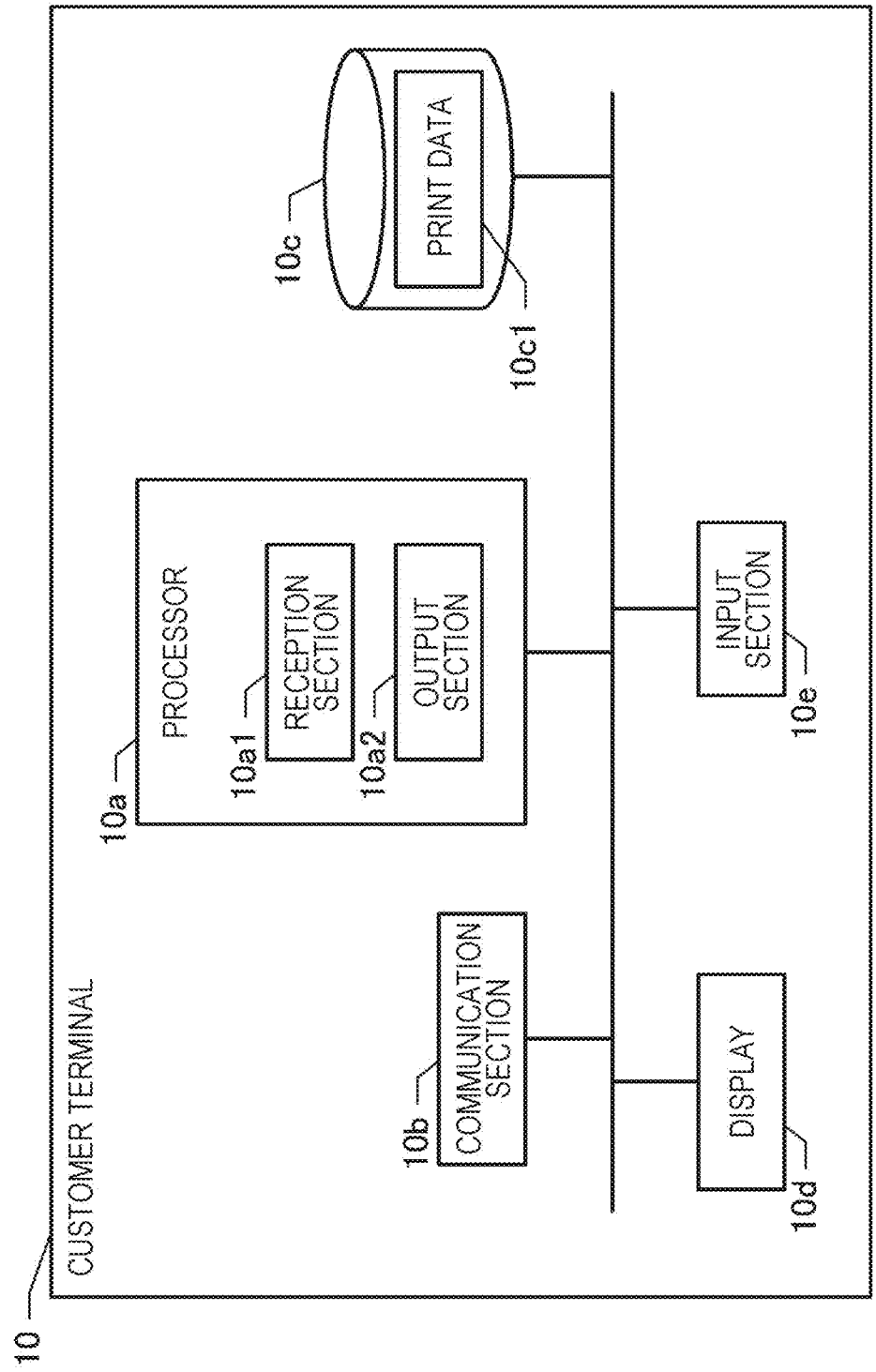
FIG. 2 is a block diagram of a customer terminal.

FIG. 2 is a block diagram illustrating the configuration of the customer terminal 10. The customer terminal 10 includes a processor 10a, a communication section 10b, a nonvolatile memory 10c, a display 10d, and an input section 10e. The processor 10a includes a CPU, a ROM, a RAM, and the like, which are not illustrated in FIG. 2, and is able to execute various programs recorded in the nonvolatile memory 10c to control each section of the customer terminal 10 and the printer 51.

In this regard, the processor 10a may be constituted by a single chip, multiple chips, or a SoC with various functional blocks. Also, for example, an ASIC may be employed instead of the CPU, or the CPU and an ASIC may work in combination. When each device according to the present embodiment includes a processor, the processor is able to be realized in various modes in the same manner as the processor 10a.

The communication section 10b includes a communication interface for communicating with an external device in accordance with various communication protocols. The customer terminal 10 is able to communicate with another device via the communication section 10b. Also, the communication section 10b includes an interface for communicating with various removable memory of the customer terminal 10.

The display 10d is a display device for displaying any image. The input section 10e is constituted by a device for a user to perform an input operation and includes, for example, a touch panel or the like. In the present embodiment, it is assumed that the customer terminal 10 is a tablet terminal, and thus the input section 10e is assumed to be mainly a touch panel, but a keyboard, a mouse, or the like may be used for the input section 10e as a matter of course. In any case, it is possible for the user as a customer to input a user intention by operating the input section 10e while viewing an image or text displayed on the display 10d.

The processor 10a executes a printed material production program not illustrated in FIG. 2. When the printed material production program is executed, the processor 10a functions as a reception section 10a1 and an output section 10a2. The reception section 10a1 has a function of receiving an order of a printed material. A customer operates the input section 10e while viewing the display 10d when placing an order, and specifies an image formed on a three-dimensional medium, the size and the position of the image, and the like. The reception section 10a1 generates print data 10c1 for forming an image on the medium in the specified manner. The print data 10c1 is recorded in the nonvolatile memory 10c in association with the identification information of the order and the print settings. A detailed description of the processing will be given later. The print settings include at least information on the size and the position of the image.

In the present embodiment, the customer specifies an image and the like by using the customer terminal 10. Accordingly, the customer has an idea of a three-dimensional medium on which an image is formed, that is to say, the completed printed material in accordance with an image displayed on the two-dimensional display 10d. However, when the print settings are performed by using a view taken from only a single direction of a three-dimensional medium or only a development view of a three-dimensional medium, it sometimes becomes difficult to have an idea of the completed product. Thus, in the present embodiment, it is possible to preview a plurality of faces of the three-dimensional printed material after printing.

The output section 10a2 has a function of performing such a preview. That is to say, when the order includes production of a three-dimensional printed material, the output section 10a2 has a function of outputting a first preview indicating a plurality of faces of the three-dimensional printed material after printing. When a view of a three-dimensional object is taken from a single direction, for example, when a perspective view is displayed as a preview, the state of the face not expressed in a perspective view is unknown. Thus, in the present embodiment, the output section 10a2 generates an image when the three-dimensional object is seen from a plurality of directions in the state in which the image is formed on the three-dimensional medium and displayed on the display 10d. As a result, it is possible for the user as a customer to easily have an idea of the completed printed material. A detailed description will be given of the processing later. When the order is confirmed by the customer, the print data 10c1 is transmitted to the staff terminal 20, and payment is made.

1.2 Staff Terminal Configuration

Figure 3:
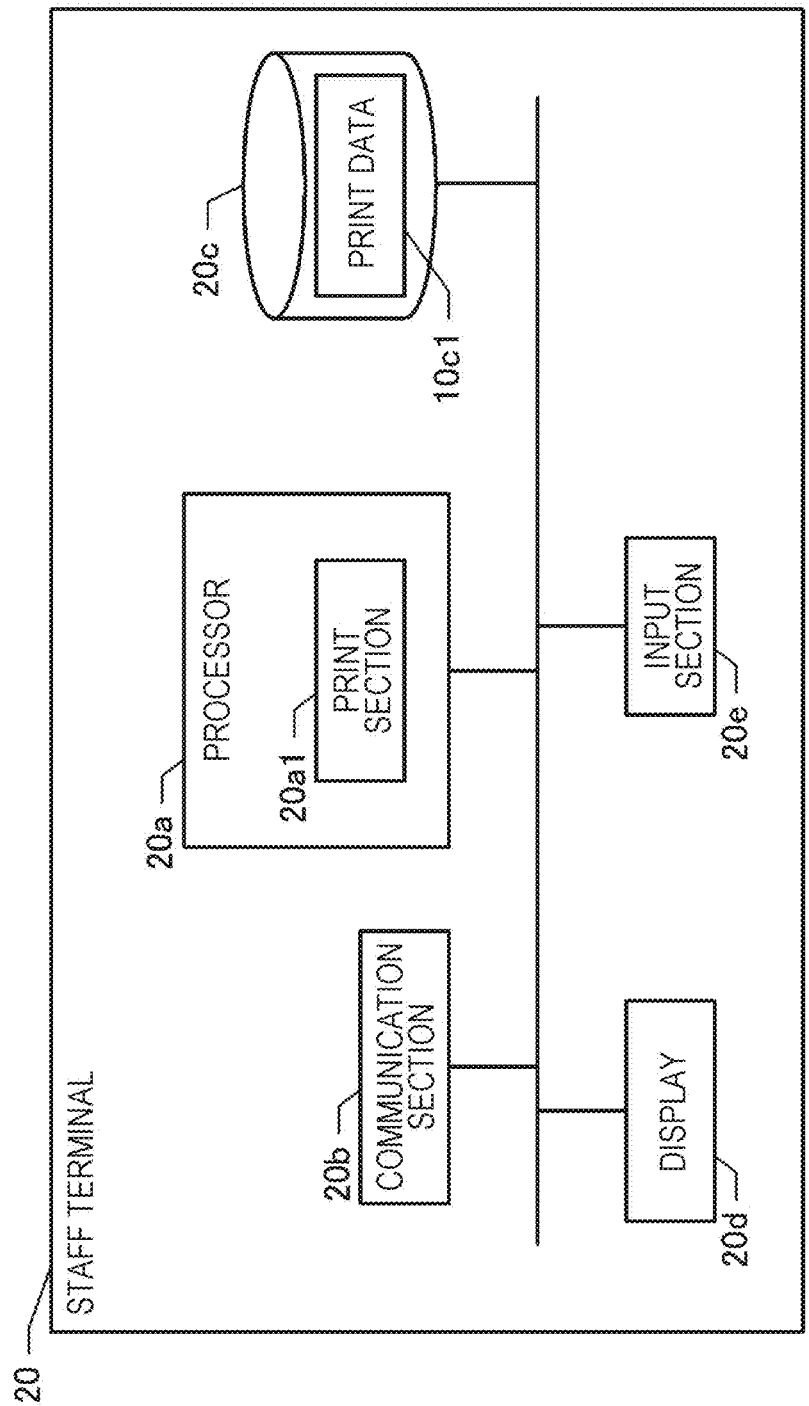
FIG. 3 is a block diagram of a staff terminal.

FIG. 3 is a block diagram illustrating the configuration of the staff terminal 20. The staff terminal 20 includes a processor 20a, a communication section 20b, a nonvolatile memory 20c, a display 20d, and an input section 20e. The processor 20a includes a CPU, a ROM, a RAM, and the like, which are not illustrated in FIG. 3, and is able to execute various programs recorded in the nonvolatile memory 20c to control each section of the staff terminal 20 and the printer 52. The nonvolatile memory 20c stores the print data 10c1 transmitted from the customer terminal 10.

The communication section 20b includes a communication interface for communicating with an external device in accordance with various communication protocols. The staff terminal 20 is able to communicate with another device via the communication section 20b. Also, the communication section 20b includes an interface for communicating with various removable memory of the staff terminal 20.

The display 20d is a display device for displaying any image. The input section 20e is constituted by a device for a user to perform an input operation and includes, for example, a touch panel or the like. In the present embodiment, it is assumed that the staff terminal 20 is a tablet terminal, and thus the input section 20e is assumed to be mainly a touch panel, but a keyboard, a mouse, numeric keys, or the like may be used for the input section 20e as a matter of course. In any case, it is possible for the user as a staff member at the shopfront to input a user intention by operating the input section 20e while viewing an image or text displayed on the display 20d.

In the present embodiment, the staff terminal 20 constituted by a tablet terminal is coupled to a POS (Point Of Sales) system not illustrated in FIG. 3. The processor 20a is able to perform reception of an order and payment processing. When a purchase intention by a customer is confirmed, the processor 20a causes the POS system to perform payment processing.

When the payment processing is performed, the processor 20a prints an order sheet indicating the contents of the ordered printed material. Accordingly, the processor 20a executes a printed material production program not illustrated in FIG. 3. When the printed material production program is executed, the processor 20a functions as a print section 20a1. The print section 20a1 prints an order sheet including a preview for each printed material of the paid order. The preview is an image for confirming the state of the completed product before producing a printed material and may be expressed in various manners. For example, a preview may include a view in which an image to be printed is overlaid on the medium or the like.

However, in the present embodiment, an order sheet provided to the customer has a different preview displayed in accordance with the number of three-dimensional printed materials. Specifically, when an order includes production of a three-dimensional printed material, and the number of the types of the printed materials is one, the print section 20a1 prints a first preview on the order sheet. Accordingly, the print section 20a1 refers to the print data 10c1 and generates an image viewed when the three-dimensional object is seen from a plurality of directions in the state in which the image is formed on the three-dimensional medium. When the order includes a planar printed material in addition to the three-dimensional printed material, the print section 20a1 generates an image indicating the planar printed material. The print section 20a1 arranges the generated image in a default area of the order sheet to generate data for printing an order sheet. The print section 20a1 then controls the printer 52 in accordance with the data to print the order sheet including the first preview.

On the other hand, when the order includes production of more than one predetermined type of three-dimensional printed material, the print section 20a1 prints a second preview instead of the first preview of a predetermined three-dimensional printed material on the order sheet. In the present embodiment, there are two predetermined types, and the second preview is a preview (for example, a perspective view or the like) indicating one face of the three-dimensional printed material after printing. Accordingly, when production of two or more types of three-dimensional printed material is ordered, the print section 20a1 refers to the print data 10c1 and generates an image in the case of viewing the three-dimensional object from one direction in the state in which an image of the three-dimensional medium is formed. When a planar printed material is included in the order in addition to the three-dimensional printed material, the print section 20a1 generates an image indicating the planar printed material. The print section 20a1 arranges the generated image in a default area of the order sheet and generates data for printing the order sheet. The print section 20a1 then controls the printer 52 in accordance with the data and prints the order sheet including the second preview.

The image viewed from a plurality of directions of a three-dimensional printed material includes images seen over a plurality of faces. To print so as not to obscure, it is necessary to have a print area of some size. When an order includes production of predetermined types of three-dimensional printed materials, it becomes necessary to have a large print area to print images viewed from a plurality of directions of the three-dimensional printed materials in an arranged manner for each of all the types of printed materials. Accordingly, in the present embodiment, when an order includes production of predetermined types of three-dimensional printed materials, an order sheet including a second preview is configured to be handed to a customer. As a result, it is possible for the customer to easily have an idea of the ordered printed material. Also, a second preview is an image viewed from one direction of a three-dimensional object, and thus it is possible for the customer to grasp the contents of the order relatively easily compared with the case in which an order identification number, the name of a medium, and the like are printed.

In this regard, in the present embodiment, the type of a printed material is defined in the print settings. That is to say, a printed material having different print settings is a different type of a printed material. For example, when the same image is formed on a different medium, the type of the printed material differs. Also, even when the same image is formed, in a case in which the position of the image on a three-dimensional medium differs, the type of the printed material differs. The details of the processing described above will be given later. The order sheet is handed to the customer. Accordingly, it is possible for the user as a customer to easily have an idea of the completed printed material. In this regard, the order sheet may be handed to a print worker who operates the print control terminal 40 in addition to the customer. Also, when the order includes production of predetermined types of three-dimensional printed material, an order sheet in which a printed material is expressed in a first preview may be printed in accordance with a customer demand or the like. When an instruction to perform payment processing is provided by the staff terminal 20, the processor 20a transmits print data 10c1 recorded in the nonvolatile memory 20c to the server 30.

1.3 Server Configuration

Figure 4:
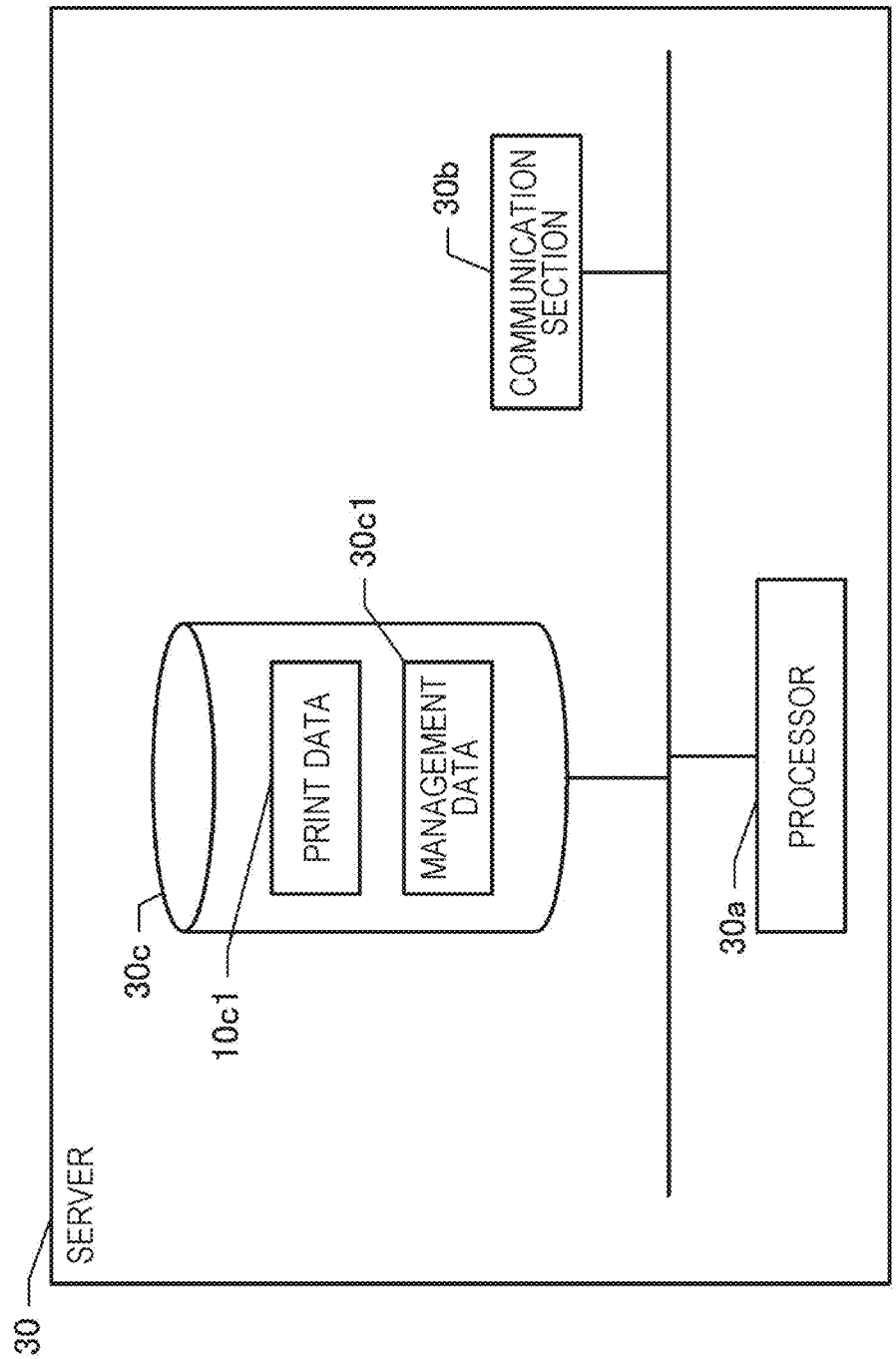
FIG. 4 is a block diagram of a server.

FIG. 4 is a block diagram illustrating the configuration of the server 30. The server 30 includes a processor 30a, a communication section 30b, and a nonvolatile memory 30c. The processor 30a includes a CPU, a ROM, a RAM, and the like, which are not illustrated in FIG. 4, and is able to execute various programs recorded in the nonvolatile memory 30*c* so as to control each section of the server 30 and each device coupled to the network.

The communication section 30*b* includes a communication interface for communicating with an external device in accordance with various wired or wireless communication protocols. The server 30 is able to communicate with another device via the communication section 30*b*. In this regard, the communication section 30*b* may include an interface for communicating with various removable memory of the server 30.

The nonvolatile memory 30*c* of the server 30 stores various kinds of information. For example, the print data 10*c*1 transmitted from the staff terminal 20 is stored in the nonvolatile memory 30*c*. Also, the management data 30*c*1 for managing the ordered production is recorded in the nonvolatile memory 30*c*.

The management data 30*c*1 is the information indicating the progress of an order. In the present embodiment, information indicating the progress, such as before printing, printing, printed, and the like is generated per identification information of an order, and is recorded as management data 30*c*1. When print data 10*c*1 is transmitted from the staff terminal 20, the processor 30*a* generates management data 30*c*1 associating the identification information of an order with respect to the print data 10*c*1 with the information indicating that the status is before printing.

When printing of the print data 10*c*1 is started in response to the operation of a print worker described later, the print control terminal 40 transmits the information indicating the start of printing, and thus the processor 30*a* updates the status associated with the identification information of the order from "before printing" to "printing". When the printing ends, the print control terminal 40 transmits the information indicating the completion of the printing, and the processor 30*a* updates the status associated with the identification information of the order from printing to printed. It is possible for the staff terminal 20 and the print control terminal 40 to refer to the management data 30*c*1 at any time.

1.4 Print Control Terminal Configuration

Figure 5:
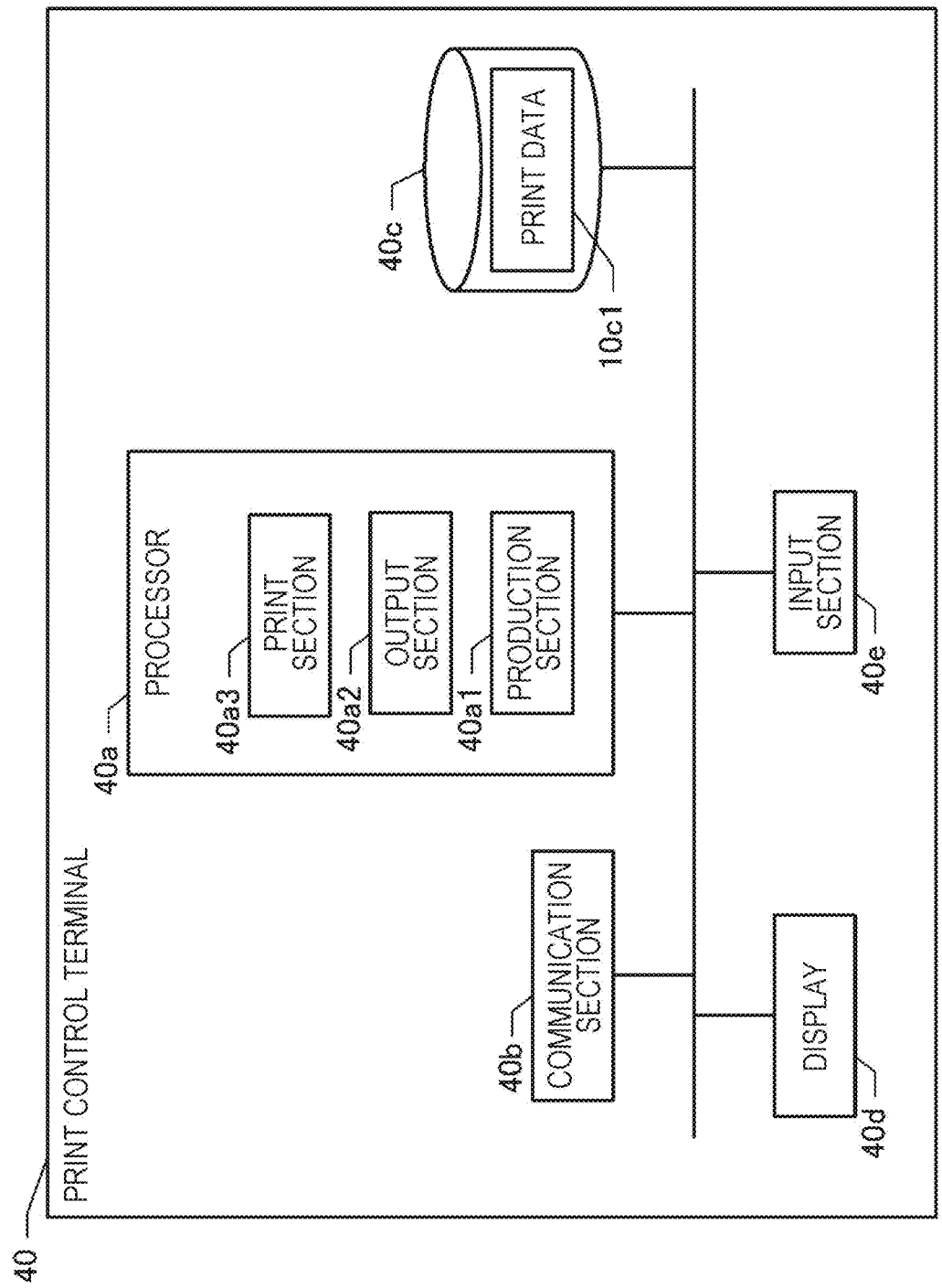
FIG. 5 is a block diagram of a print control terminal.

FIG. 5 is a block diagram illustrating the configuration of the print control terminal 40. The print control terminal 40 includes a processor 40*a*, a communication section 40*b*, a nonvolatile memory 40*c*, a display 40*d*, and an input section 40*e*. The processor 40*a* includes a CPU, a ROM, a RAM, and the like, which are not illustrated in FIG. 5, and is able to execute various programs recorded in the nonvolatile memory 40*c* to control each section of the print control terminal 40 and the printers 50*a* and 50*b*. The nonvolatile memory 40*c* stores the print data 10*c*1 of the order specified by the print worker.

The communication section 40*b* includes a communication interface for communicating with an external device in accordance with various communication protocols. The print control terminal 40 is able to communicate with another device via the communication section communication section 40*b*. Also, the communication section 40*b* includes an interface for communicating with various removable memory of the print control terminal 40.

The display 40*d* is a display device for displaying any image. The input section 40*e* is constituted by a device for a user to perform an input operation and includes, for example, a keyboard, a mouse, or the like. In the present embodiment, it is assumed that the print control terminal 40 is a stationary type computer, and thus the input section 40*e* is assumed to be mainly a keyboard or a mouse, but a touch panel or the like may be used for the input section 40*e*. In any case, it is possible for the user as a print worker to input a user intention by operating the input section 40*e* while viewing an image or text displayed on the display 40*d*.

In the present embodiment, as described above, the printer 50*a* for forming an image on a three-dimensional medium includes a sublimation transfer method printer and a press machine for sublimation transferring an image printed on sublimation transfer paper onto a three-dimensional medium. In the present embodiment, the print worker adjusts a transfer position when transferring the sublimation transfer paper onto a three-dimensional medium. That is to say, it is possible to change the position of the image formed on the three-dimensional medium by adjustment performed by the print worker. Accordingly, the position of the image included in the print settings included in the print data 10*c*1 of a three-dimensional medium is not a parameter automatically adjusted by the printer 50*a* at the time of forming an image on the three-dimensional medium, but is adjusted manually by the print worker.

On the other hand, the customer places an order after having an idea on the position of an image formed on a printed material medium or the like. When the print worker forms an image on the three-dimensional medium without grasping a customer intention, a printed material different from that of the customer order might be produced. Accordingly, in the present embodiment, the print control terminal 40 also displays and prints the first preview.

To perform such processing, the processor 40*a* executes a printed material production program not illustrated in FIG. 5. When the printed material production program is executed, the processor 40*a* functions as a production section 40*a*1, an output section 40*a*2, and a print section 40*a*3.

The production section 40*a*1 has a function of forming an image on a three-dimensional medium in accordance with the print settings and producing a printed material. The production section 40*a*1 refers to the print data 10*c*1 of the order specified by the print worker by using the input section 40*e* and gives a print instruction to the printers 50*a* and 50*b* in accordance with the print settings. The printers 50*a* and 50*b* print the image indicated by the print data 10*c*1 in response to the print instruction.

The output section 40*a*2 has the same function as that of the output section 10*a*2. That is to say, the output section 10*a*2 generates images of a three-dimensional medium, which are viewed from a plurality of directions in accordance with the print data 10*c*1, in the state in which the image is formed on the three-dimensional object, and displays the images on the display 10*d*. As a result, it is possible for a user as the print worker to easily have an idea of the completed printed material.

The print section 40*a*3 prints an order sheet including a preview per a printed material with reference to the paid order. The preview is an image for confirming the state of the completed product of a printed material before production and may be made in various ways. For example, an image including an image to be printed and the medium overlaid or the like may be a preview.

However, when an order includes production of a three-dimensional printed material, the order sheet includes a first preview of the three-dimensional object. That is to say, a first preview indicating a plurality of faces of the three-dimensional printed material after printing is printed on the order sheet. Accordingly, the print section 40*a*3 refers to the print data 10*c*1 and generates an image viewed from a plurality of directions of the three-dimensional object in the state in which the image is formed on the three-dimensional medium to generate data for printing the order sheet. The print section 40a3 then controls the printer 52 in accordance with the data and prints the order sheet including the first preview. The details of the processing will be described later.

When an image is formed on the three-dimensional medium to produce a printed material, the image is printed on sublimation transfer paper by using the printer 50a. The print worker puts the sublimation transfer paper on the three-dimensional medium and performs sublimation transfer of the image onto the three-dimensional medium by using the press machine. At this time, there is still room for changing the detailed specification of the position, the direction, and the posture of the medium, the placement position of sublimation transfer paper, the position where the image is printed on the sublimation transfer paper, and the like. The print worker then grasps the position where the image is formed on the three-dimensional medium by referring to the order sheet. The print worker then adjusts the position, the direction, and the posture of the medium, and the position where the sublimation transfer paper is placed, and the like, and sets the position of the image formed on the three-dimensional medium by using the press machine in accordance with the customer order. After such adjustment, the print worker performs pressing by using the press machine. By performing the work described above, it is possible to produce a printed material in which an image is formed on a three-dimensional in accordance with the customer order.

In this regard, the order sheet printed by the staff terminal 20 is used by the customer, and the order sheet printed by the print control terminal 40 is used by the print worker. Accordingly, in the present embodiment, the individual order sheets may differ. That is to say, when the order includes predetermined types of three-dimensional printed materials in the order sheet for a customer, a second preview, that is to say, the image viewed from one direction of the three-dimensional printed material is printed on the order sheet. As a result, it is possible for the image not to occupy excessively large space in the order sheet to be handed to the customer.

On the other hand, for an order sheet for the print worker, the order sheet including a first preview, that is to say, the image viewed from a plurality of directions of the three-dimensional printed material is printed regardless of the type of the three-dimensional printed material. As a result, it becomes possible for the print worker to easily have an idea of the completed printed material in accordance with the order sheet and adjust the position where the image is formed on each printed material after grasping the customer intention.

2. Printed Material Production Processing

Figure 6:
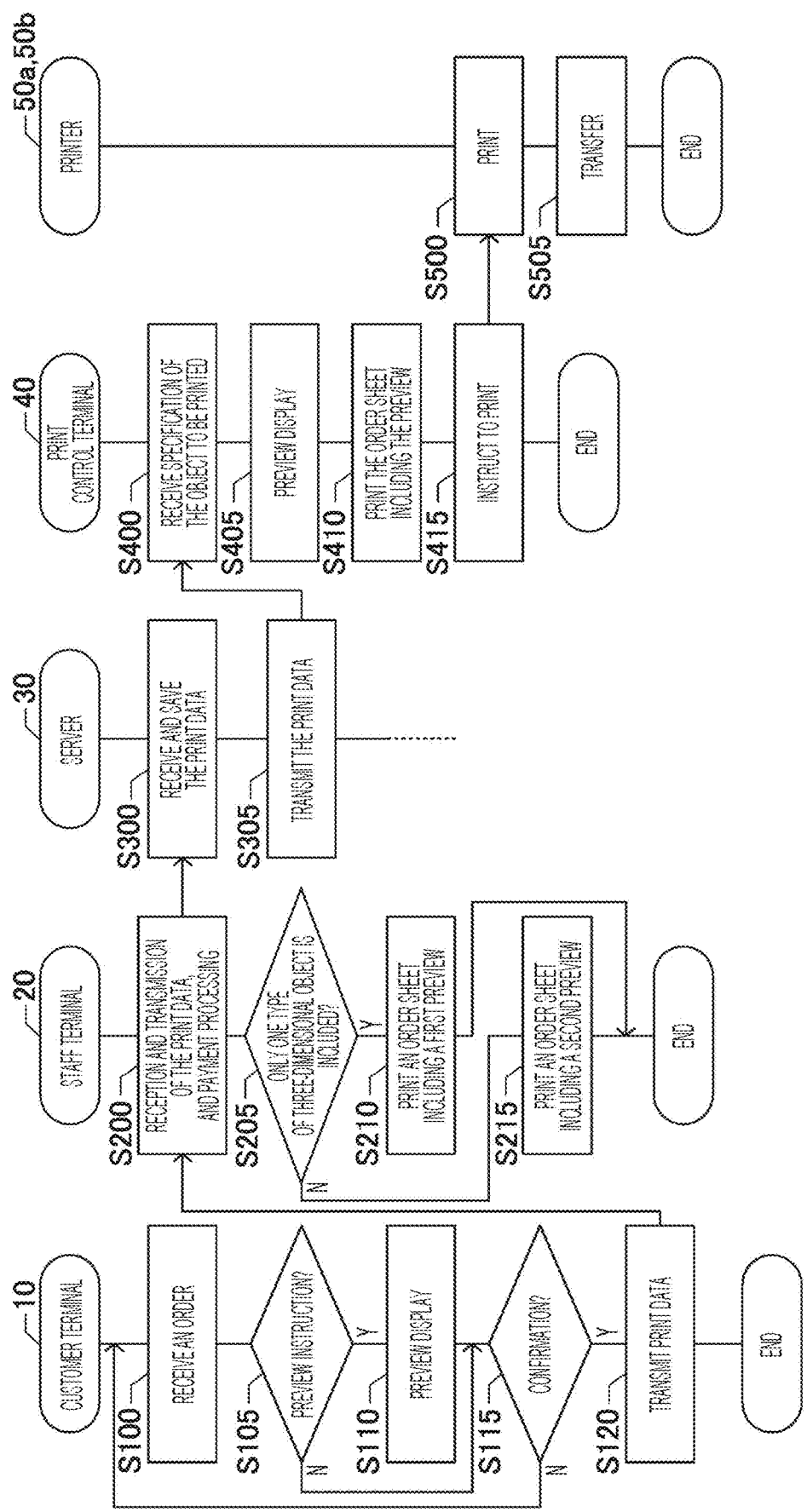
FIG. 6 is a sequence chart of printed material production processing.

FIG. 6 is a sequence chart of the printed material production processing. When a customer starts to order a printed material at a shopfront, the printed material production processing regarding the order is started. When the customer starts the order work, the processor 10a receives the order by performing the function of the reception section 10a1 (step S100). Specifically, the customer selects a medium on which a desired image is formed while referring to a sample of the medium at the shopfront, the image of a medium which is displayed on the display 10d or the like. Also, the customer selects an image stored in a removable memory or the like and transfers the image to the customer terminal 10.

The media may include a three-dimensional medium and a planar medium. One customer sometimes places an order in which an image is formed on a plurality of types of media. When an image is formed on a planar medium, the customer inputs the type of medium, an image (file name or the like) to be printed, the size and the position of the image, and the number of copies as the print settings. When an image is formed on a three-dimensional medium, the customer inputs the type of medium, the image (file name or the like) to be formed, the size and the position of the image, and the number of printed materials as the print settings.

Figure 7:
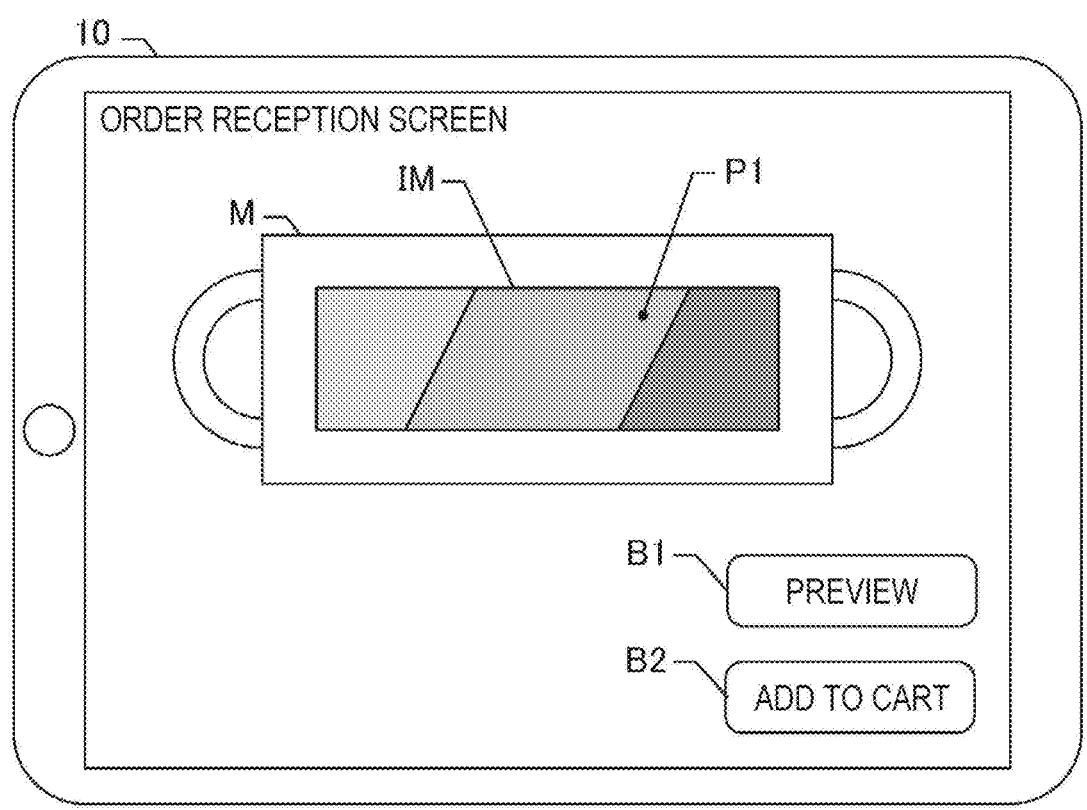
FIG. 7 is a diagram illustrating an example of an order reception screen.

The reception section 10a1 associates the print settings input by the customer with an image and stores the print settings and the image in the nonvolatile memory 10c as the print data 10c1. FIG. 7 is an order reception screen displayed on the display 10d of the customer terminal 10 when the size and the position of an image to be formed on the three-dimensional medium are determined. The development image of the medium M is displayed on the order reception screen. In this regard, in the example illustrated in FIG. 7, the medium M is a mug.

The customer operates the input section 10e to determine the size by performing trimming, enlargement, reduction, and the like on an image IM selected by the customer and adjusts the position to overlay the image IM on the medium M. By performing such processing, it is possible for the customer to consider the order contents while thinking how to overlay the image on the three-dimensional medium and determine the size and the position of the image IM. The customer inputs the print settings described above on a screen other than that of FIG. 7.

On the screen illustrated in FIG. 7, the three-dimensional medium M is developed and displayed, and thus the state of the three-dimensional printed material is difficult to understand. Accordingly, in the present embodiment, it is possible to see a preview before confirming the order. In the example illustrated in FIG. 7, an instruction button B1 for specifying whether or not to preview is provided.

The output section 10a2 determines whether or not the customer has given a preview instruction (step S105). When it is determined that a preview instruction has been given, the output section 10a2 provides a preview display (step S110). It is possible to provide a preview of various types of printed materials, that is, both of a three-dimensional printed material and a planar printed material individually. In the case of a planar printed material, the output section 10a2 provides a preview by overlaying an image to be printed on the image of the print medium on the display 10d.

Figure 8:
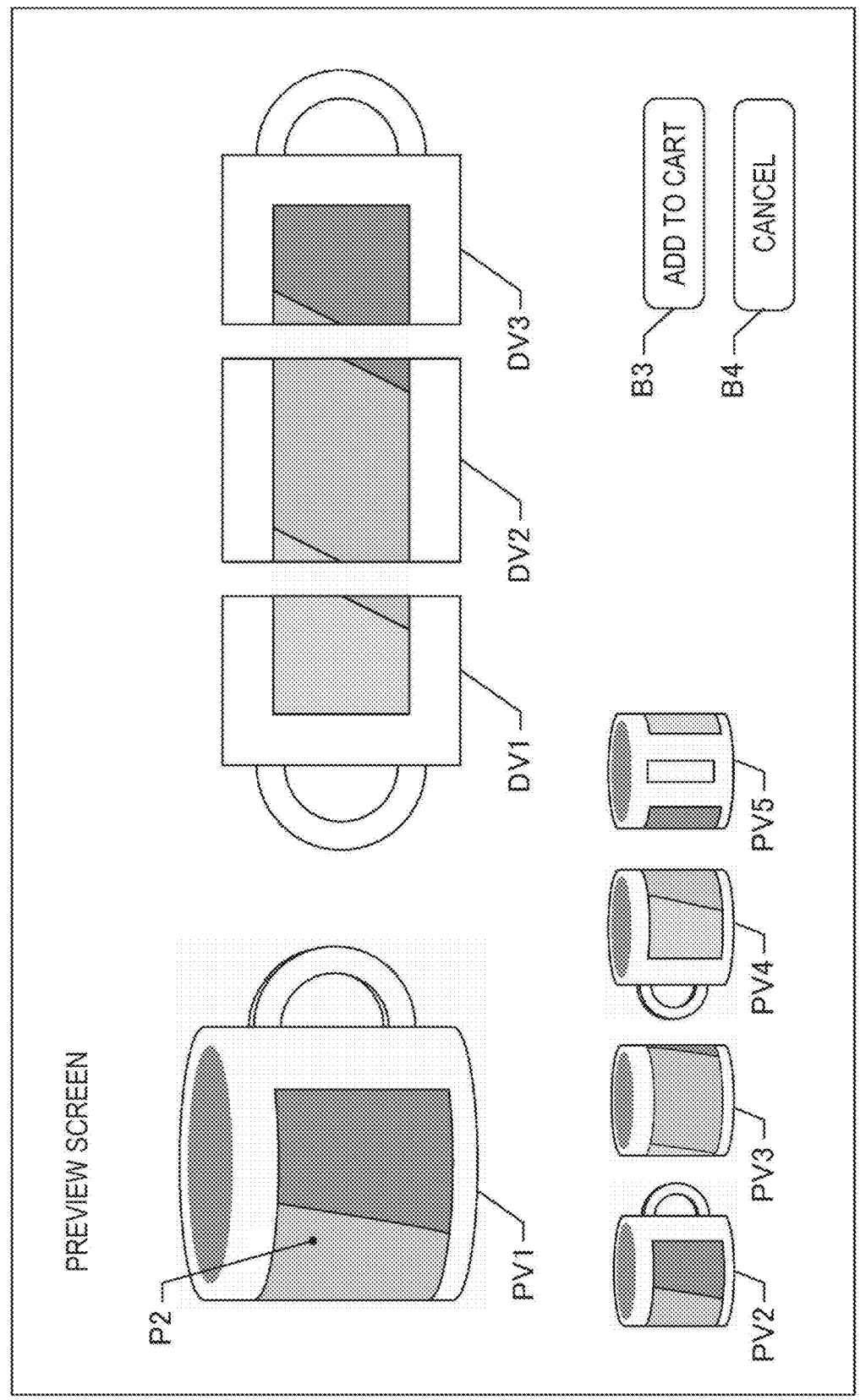
FIG. 8 is a diagram illustrating an example of a preview screen.
Figure 9:
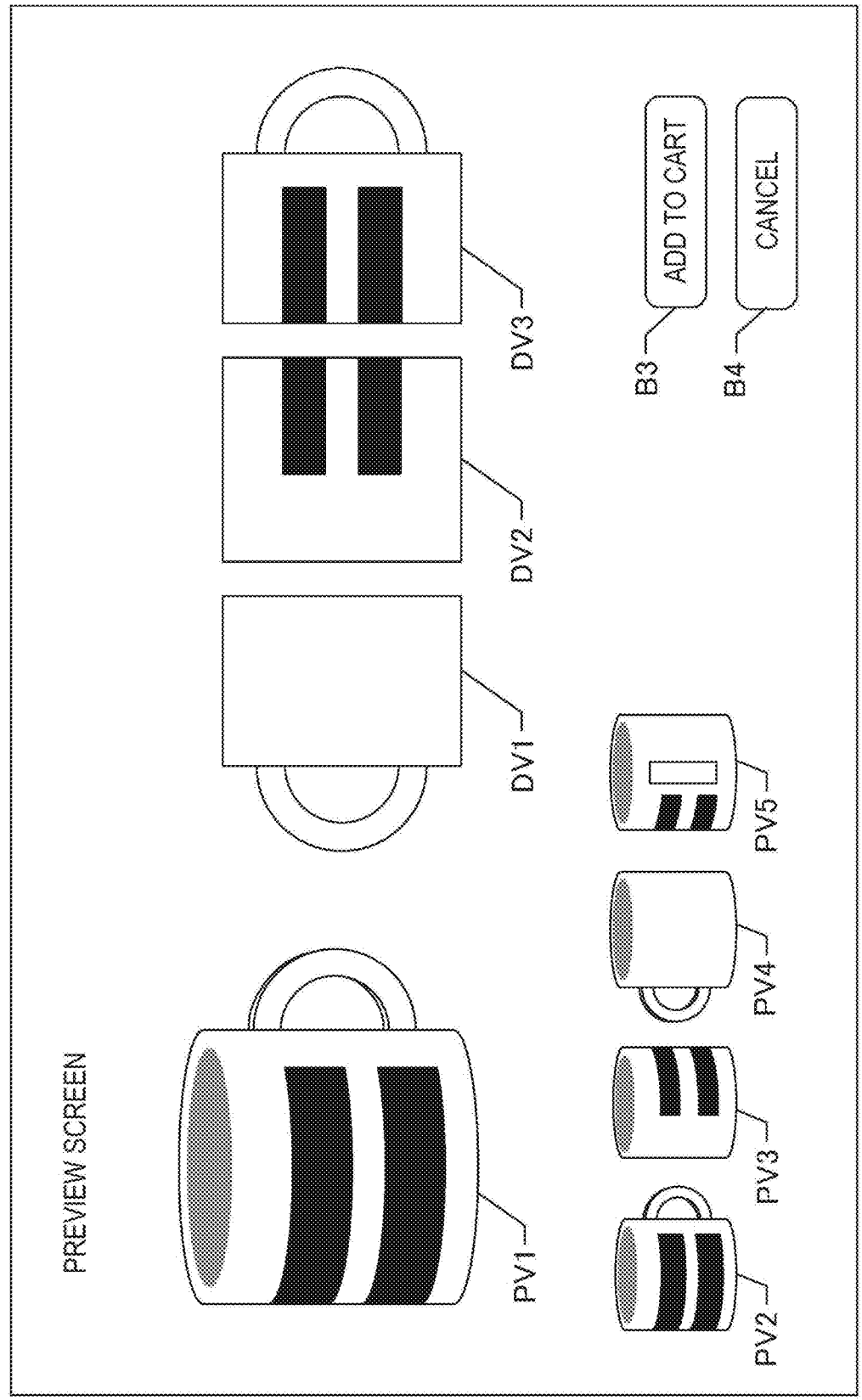
FIG. 9 is a diagram illustrating an example of a preview screen.

In the case of a three-dimensional printed material, the output section 10a2 refers to the print data 10c1 and obtains the type of the medium, the image to be printed, and the size and the position of the image. The output section 10a2 then generates an image representing a first preview indicating a plurality of faces of the three-dimensional printed material after printing in accordance with these pieces of information and displays the image on the display 10d. In the present embodiment, the first preview is an image seen from a plurality of directions of the three-dimensional printed material after printing and includes a plurality of perspective views and a plurality of development views. FIG. 8 illustrates the preview screen of the example illustrated in FIG. 7, and FIG. 9 illustrates a preview screen of another example. These diagrams include perspective views PV1 to PV5 and development views DV1 to DV3. The perspective view PV1 and the perspective view PV2 are images seen from the same direction of the three-dimensional printed material, but their sizes are different. The perspective views PV2 to PV5 are images seen from different directions of the three-dimensional printed material, and all the directions of the image forming area of the three-dimensional medium are covered. The development views DV1 to DV3 are diagrams obtained by developing the image forming area of the three-dimensional medium into a plane and dividing the plane.

Each diagram included in a preview screen may be generated by various kinds of processing, for example, it is possible to generate each diagram in accordance with the corresponding relationship between the predetermined position on the surface of the medium and the position on the perspective view. Specifically, a corresponding relationship is defined in the same manner as described below: a picture element (for example, a picture element P1 illustrated in FIG. 7) of the surface on the medium M on the order reception screen corresponds to a picture element (for example, a picture element P2 illustrated in FIG. 8) on the perspective view and the like. When such a corresponding relationship between each position on the surface of the medium and each position on a perspective view is defined in advance, it is possible to generate a perspective view in the case of disposing any image at any position of the three-dimensional surface.

In the case of development views, it is possible to generate the development views by trimming the image indicated by the print data 10c1 for each area corresponding to each face of the three-dimensional printed material and overlaying the image of the three-dimensional printed material developed on a plane on the images divided into default areas. The processing is an example and, for example, an image may be generated by overlaying an image on the three-dimensional medium in a virtual space constituted by a 3D model and viewing the image from any point of view.

FIG. 8 and FIG. 9 individually illustrate the preview screens on which images are formed on the same medium. However, the images to be individually formed are different. In FIG. 8, an image is placed on almost all over the side face of a mug, which is an image forming area. On the other hand, in FIG. 9, an image is placed on about half of the side face of a mug. In the present embodiment, in a preview of a three-dimensional printed material, as illustrated in FIG. 8 and FIG. 9, an image seen from a plurality of directions is indicated. Accordingly, as illustrated in FIG. 9, even for a printed material on which an image is formed only on a part of the image forming area, it is possible for the user to easily have an idea of the completed printed material.

When a preview is displayed, the reception section 10a1 determines whether or not a confirmation instruction of the order contents has been given in step S100 (step S115). The confirmation instruction is carried out, for example, by performing an operation on the confirmation instruction button B3 displayed on the preview screens in FIG. 8 and FIG. 9, performed by the customer by using the input section 10e. When the reception section 10a1 receives the operation on the confirmation holding button B3, the reception section 10a1 determines that the confirmation instruction has been given. When the customer operates the cancel button B4 by using the input section 10e, the reception section 10a1 does not determine that the confirmation instruction has been given. In this regard, the confirmation instruction may be given by pressing the button B2 illustrated in FIG. 7.

In step S115, when it is determined that a confirmation instruction of the order contents is given, the processor 10a transmits the print data 10c1 generated in step S100 to the staff terminal 20 (step S120).

When the print data 10c1 is transmitted to the staff terminal 20, the processor 20a receives and transmits the print data 10c1 and performs payment processing (step S200). That is to say, the processor 20a receives the print data 10c1 via the communication section 20b and saves in the nonvolatile memory 20c. Also, the processor 20a transmits the print data 10c1 to the server 30 via the communication section 20b. The server receives the transmitted print data 10c1 and saves the print data 10c1 in the nonvolatile memory 30c (step S300). Further, the processor 20a communicates with the POS system not illustrated in FIG. 3 via the communication section 20b and makes the payment of the customer order.

Next, the processor 20a prints an order sheet by using the function of the print section 20a1. For this purpose, first, the print section 20a1 determines whether or not only one type of the three-dimensional object is included (step S205). Specifically, the print section 20a1 refers to the print data 10c1 received in step S200 and determines whether or not the ordered printed material medium includes a three-dimensional medium. When a three-dimensional medium is included, the print section 20a1 determines whether or not the ordered three-dimensional printed material is only one type.

When only one type of the three-dimensional object is included, the print section 20a1 prints an order sheet including a first preview (step S210). Specifically, the print section 20a1 obtains the type of the medium, the image to be printed, and the size and the position of the image of the printed material of the three-dimensional object indicated by the print data 10c1. The print section 20a1 then generates an image indicating the first preview indicating a plurality of faces of the three-dimensional printed material after printing in accordance with these pieces of information. It is possible to realize the generation processing of the image by the same processing as that in step S110. However, the number of pixels of the image or the like may be different from that of the processing in S110.

When the image indicating the first preview is generated, the print section 20a1 generates data for placing the image at a default position of an order sheet in a predetermined format. In this regard, when the order includes a planar printed material, the print section 20a1 generates an icon image in which an image to be printed is overlaid on the image of the print medium and places the image at a default position of the order sheet.

When the data for printing the order sheet is generated, the print section 20a1 transmits the data to the printer 52. When the printer 52 receives the data, the printer 52 prints the order sheet on print paper. The order sheet is handed to the customer. FIG. 10 illustrates an example in which an order sheet includes one type of three-dimensional object. In the example illustrated in FIG. 10, the upper part of the order sheet includes, an order number, a delivery schedule of the printed material, information on a delivery staff member, paid or not, delivered or not, and parts to fill in customer information.

The lower part of these pieces of information includes a preview. In the preview, the printed material is associated with a number, and a preview is illustrated with a product name in association with each number. Also, the quantity of the printed material is indicated for each order number. FIG. 10 illustrates an example of the order sheet when an order includes two types of printed materials. The order having number 1 is an order to form an image on a mug, which is a three-dimensional medium, and includes one perspective view which is the same as that in FIG. 8 and an image in which the medium is developed into a plane and the image forming area is divided into a plurality of faces. Also, the image to be printed is included. The order having number 2 is an order to print a snap photograph on print paper, and the image to be printed is illustrated.

A first preview of a three-dimensional printed material occupies a large area in the order sheet. However, when an ordered three-dimensional object is one type, as illustrated in FIG. 10, it is possible to display the first preview on one order sheet. Further, when the preview is a planar printed material, it is possible to add the preview to the one order sheet. By using the order sheet, it is possible for the customer to easily have an idea of the completed product of the three-dimensional printed material.

In step S205, when it is not determined that only one type of three-dimensional object is included, the print section 20*a*1 prints an order sheet including a second preview (step S215). Specifically, the print section 20*a*1 obtains the type of the medium, the image to be printed, and the size and the position of the image of the three-dimensional printed material indicated by the print data 10*c*1. The print section 20*a*1 then generates an image indicating a second preview indicating a perspective view of the three-dimensional printed material after printing in accordance with these pieces of information. It is possible to realize the generation processing of the perspective view by the same processing as the processing in step S110. However, the number of pixels of the image or the like may differ from that of the processing in S110.

When a perspective view indicating a second preview is generated for each three-dimensional printed material, the print section 20*a*1 generates data for arranging the perspective view at a default position on the order sheet in a predetermined format. In this regard, when the order includes a planar printed material, the print section 20*a*1 generates an icon image in which the image to be printed is overlaid on the image of the print medium, and the icon image is placed at a default position of the order sheet.

When the data for printing the order sheet is generated, the print section 20*a*1 transmits the data to the printer 52. When the printer 52 receives the data, the printer 52 prints the order sheet on print paper. The order sheet is handed to the customer. FIG. 11 illustrates an example of the order sheet in which the three-dimensional objects are not of one type. In FIG. 11, the format of the order sheet is the same as that in FIG. 10. FIG. 11 illustrates an example of the order sheet in which three types of printed materials are ordered. The orders of number 1 and number 2 are the orders in which an image is formed on a mug, which is a three-dimensional medium, and an image of each order is expressed in the same perspective view as that in FIG. 8. The order of number 3 is an order in which a snap photograph is printed on print paper, and the image to be printed is indicated.

In the example illustrated in FIG. 11, a second preview of a three-dimensional printed material is illustrated by one perspective view for each printed material, and thus an area occupied by the perspective view of each printed material is small compared with that in the case of a first preview. Accordingly, it is possible to arrange the second previews of a plurality of printed materials on one order sheet. It is therefore possible to make the order sheet to be handed to the customer compact.

When the server 30 saves the print data 10*c*1, it is possible for the print worker to perform the work. When the work is performed, the print worker operates the print control terminal 40 to give a start instruction of the printing. When a start instruction of the printing is given, the processor 40*a* of the print control terminal 40 receives the specification of the object to be printed (step S400). That is to say, the processor 40*a* causes the print worker to specify the order to be processed. Specifically, the processor 40*a* inquires the order before printing of the server 30. The processor 30*a* of the server 30 refers to the management data 30*c*1 in the non-volatile memory 30*c*, identifies the print data 10*c*1 of the order before printing, and transmits the print data 10*c*1 to the print control terminal 40 (step S305). The processor 40*a* receives the print data 10*c*1 and displays the order before printing on the display 40*d* as selectable. The display mode is not limited, and, for example, the identification information of the orders may be displayed in a list, or the images to be printed may be displayed in a list. In any case, the print worker operates the input section 40*e* to specify the objet to be printed.

When the object to be printed is specified, the processor 40*a* displays the preview by using the function of the output section 40*a*2 (step S405). In the present embodiment, the output section 40*a*2 displays a preview for each printed material specified in step S400. When the printed material is a three-dimensional object, the output section 10*a*2 then displays a first preview, whereas when the printed material is planar, the image to be printed is displayed. It is possible to produce the image for displaying the first preview by performing the same processing as that of step S110. The image to be displayed as the first preview only needs to be an image seen from a plurality of directions of the three-dimensional medium and is not limited. However, for example, the image may be constituted by the same image as those in FIG. 8 and FIG. 9. When the order includes a plurality of printed materials, the printed material to be displayed may be changed in accordance with an instruction by the print worker. By the display described above, it is possible for the user as a print worker to easily have an idea of the completed product of the printed material.

Next, the print section 40*a*3 prints the order sheet including the preview (step S410). When the order is a three-dimensional printed material, a first preview is printed in the present embodiment regardless whether or not the type of the three-dimensional printed material is a predetermined type. When the printed material is planar, an image in which an image to be printed is overlaid on the print paper is printed. In this regard, the generation processing of the image indicating a first preview may be realized by performing the same processing as the processing in step S110. However, the number of pixels of the image or the like may be different from that of the processing in S110. Also, the format of the order sheet may be the same as that in step S210. However, the first previews are printed for all the ordered three-dimensional printed materials regardless of whether or not the type of the three-dimensional printed material is a predetermined type.

When the image indicating the preview is generated, the print section 40*a*3 generates the data for arranging the image at a default position of the order sheet and printing the image. When the data for printing the order sheet is generated, the print section 40*a*3 transmits the data to the printer 50*b*. When the printer 50*b* receives the data, the printer 50*b* prints the order sheet on print paper. The order sheet is referenced by the print worker. FIG. 12 illustrates an example of the order sheet to be printed. In the example illustrated in FIG. 12, first previews are printed under the order number. The first previews illustrated in FIG. 12 are constituted by the image of the same type as the first preview illustrates in FIG. 10. In this regard, in the present embodiment, when the previews of the ordered printed materials do not fit on one order sheet, the previews are printed on two or more order sheets.

The first preview of a three-dimensional printed material occupies a large area in the order sheet. However, in the present embodiment, the first previews of all the three-dimensional printed materials are printed. It is necessary for the print worker of produce a printed material on which a customer intention is reflected. Accordingly, the first previews are printed for all the three-dimensional printed materials so that the print worker is able to correctly grasp the customer intention regardless of the area efficiency of the order sheet. By using the order sheet, it is possible for the print worker to easily have the idea of the completed production of all the three-dimensional printed materials.

When the order sheet is printed, the processor 40*a* performs print processing by the function of the production section 40*a*1 (step S415). That is to say, the production section 40*a*1 refers to the print data 10*c*1 to be printed, which is received in step S400, and identifies the print settings. The production section 40*a*1 then generates data for printing the image included in the print data 10*c*1 by using the print settings and transmits the data to the printers 50*a* and 50*b*. When the printers 50*a* and 50*b* receive the data, the printers 50*a* and 50*b* perform printing (step S500).

When the object to be printed includes a printed material, which is a three-dimensional medium, the image is printed on sublimation transfer paper. In this case, the print worker refers to the image displayed on the display 40*d* in step S405 or the order sheet printed in step S410 and sets the transfer position. That is to say, the print worker sets a three-dimensional medium for the press machine and adjusts the transfer position on the sublimation transfer paper by referring to the image displayed on the display 40*d* or the order sheet. When the transfer position is adjusted, the print worker operates the press machine to transfer the image to form the image on the three-dimensional medium (step S505). In this regard, when the object to be printed does not include a printed material, which is a three-dimensional medium, the processing of step S505 may be skipped.

3. Other Embodiments

The embodiment described above is an example for carrying out the present disclosure, and it is possible to employ various other embodiments. For example, the type of the printers described in the embodiment described above is only an example, and various other printers may be employed for forming an image on a three-dimensional medium. The type of printers for forming an image on a planar medium is also not limited.

Also, the device configuration of the printed material production system is not limited to the configuration illustrated in FIG. 1. For example, the devices installed at a shop and a backyard may have a different configuration from that illustrated in FIG. 1. Also, the individual terminals illustrated in FIG. 1 may be constituted by fewer terminals that share the functions, or may be constituted by more terminals. For example, the customer terminal 10 and the staff terminal 20 may be the same terminal, or the server 30 and the print control terminal 40 may be the same terminal. Further, the server 30 may be a cloud server, or the like, and each terminal may be constituted by more terminals.

Also, a first preview in the development form, which is developed from a three-dimensional printed material, is not limited to the views, such as the development views DV1 to DV3 illustrated in FIG. 8 and FIG. 9. For example, in the case of a three-dimensional object having a plurality of planes, such as a cuboid or the like, the first preview may be constituted by the development views of the cuboid. Further, in the case of a three-dimensional object having a concave portion formed by a face including a curved surface, such as a smartphone case or the like, it is possible to constitute development views by converting the curved surface into a plane, and cutting and placing the curved surface on a plane or the like. With the configuration described above, it becomes possible to easily grasp the image when a three-dimensional printed material is viewed from a plurality of directions.

The reception section needs only to be configured to receive an order of a printed material. That is to say, the reception section may be configured to receive information for identifying a printed material to be produced. The order only has to indicate at least a printed material to be produced, but may include the other information, for example, the print settings. The print settings include the information regarding the settings necessary for forming the image of the printed material, and, for example, may include various kinds of information necessary for forming an image, a print quality and a print speed, the type of ink to be used, a method of forming an image, and the like.

When the order includes production of a three-dimensional printed material, the output section outputs a first preview indicating a plurality of faces of the three-dimensional printed material after printing. That is to say, the reception section outputs the state indicating a plurality of faces of the three-dimensional printed material after printing so that a user who views the output is only able to easily have an idea of the completed production of the three-dimensional printed material.

The first preview only has to indicate a plurality of faces of the three-dimensional printed material after printing. That is to say, when a three-dimensional object is viewed from a certain direction, an image formed on the three-dimensional object is sometimes hidden. Accordingly, the first preview only has to be constituted so that the printed state on a hidden face is able to preview by outputting the state of viewing the three-dimensional object from a plurality of directions.

The plurality of faces only have to be determined so that the images formed by individual faces do not overlap each other or at least a part of the images do not overlap. That is to say, the plurality of faces only have to be determined so that the first preview is divided into a plurality of parts such that at least a part of the images formed on the three-dimensional printed material does not overlap each other. Also, the plurality of faces may be predetermined or may be variable in accordance with the size of the image and the print area. The first preview indicating a plurality of faces of the three-dimensional printed material after printing may be development views such as the embodiment described above or the like, or may be individual images seen from a plurality of viewpoints of the three-dimensional printed material. For the latter, the first preview may be constituted by at least two-side map or more among six-side map. Of course, the drawing method is not limited, and a curved surface of the printed material may be converted into a plane and may be output. The drawing method of the first preview may differ depending on the type of the three-dimensional medium.

When an order includes production of a three-dimensional printed material, the first preview may always be output, or may be output when an order includes production of a three-dimensional printed material and further the other conditions are met. In the latter case, when the types of the ordered printed materials are plural, a list of the orders is output first, and further when a user gives the specification, a first preview is output. The mode of outputting a first preview may be various. For example, the first preview may be displayed on a display, may be printed out on a print medium, such as print paper or the like, or may be projected by a projector. In any case, when an order includes production of a three-dimensional printed material, a first preview, which is not output in the case of a planar printed material, needs only to be output.

The production section needs only to perform printing and produce a three-dimensional printed material and a planar printed material in accordance with the order. That is to say, the printed material may be either a three-dimensional object or a planar object. The order needs to be placed so that at least either one is produced, and the production section needs only to cause the printer to produce a printed material, or to print on sublimation transfer paper to cause a print worker to transfer the image.

The printing may be carried out directly on a three-dimensional object or a planar medium, or may not be carried out directly. In the latter case, it is assumed that the image printed on the print medium is transferred onto the medium or the like to produce a printed material. The mode of forming an image on the medium may be performed in any way. Printing is performed in any step in the process described above. Accordingly, an object to be produced is referred to as a printed material. A three-dimensional or planar medium only needs to be an object on which an image is formed, and is not limited to the example in the embodiment described above. The three-dimensional medium is assumed to be a various kind of medium, for example, a can body, a signboard, a photo frame, an object produced by a 3D printer, or the like. The planar medium is assumed to be a various kind of medium, for example, print paper, cloth, or the like. Of course, the quality of the material of the medium is not limited.

The print section needs only to perform printing on an order sheet including a first preview for each printed material. One order sheet may include a first preview of one printed material or first previews of a plurality of printed materials. However, a first preview is a preview for each printed material, and thus it is desirable that a first preview of the same printed material be laid out so as not to be separated on a plurality of order sheets. In this regard, in the embodiment described above, a plurality of computers include a print section, but the print section may be disposed in any one of the computers.

A second preview only has to a preview seen from one direction of the three-dimensional printed material. Accordingly, a second preview is not limited to a perspective view as in the embodiment described above, and for example, may be any one of six-side map. A determination of whether to print a first preview or a second preview is not limited to the above description. A preview is not limited to two types. For example, when three types of previews are used, as the number of three-dimensional printed materials increases, the mode of the preview may be changed, such as the output of a first preview, the output of a third preview, and the output of a second preview. A third preview may be a view having an occupied area smaller than that of the first preview and a smaller number of images than that of the first preview, but having an occupied area larger than that of the second preview and a larger number of images than that of the second preview. Alternatively, some of the three-dimensional printed materials may be expressed in the same mode of the first preview, and the remaining three-dimensional printed materials may be expressed in the same mode as the second preview. Also, when the number of three-dimensional printed materials increases, the view may be changed from a first preview to a second preview, but when the number further increases, and the second preview overflows from the screen or from the print paper, the view may be changed to a first preview again. In that case, when the number of three-dimensional printed materials increases, the view may be changed from the first preview to the second preview again so that the print paper to be printed does not exceed two pages.

Further, it is possible to apply the present disclosure as a program performed by a computer or a method. Also, the above-described system, program, and method may be realized as a single device, realized by using a part included in a plurality of devices, or each element is sometimes disposed in a different device from the device described above, and may include various modes. Also, it is possible to suitably change a part of the disclosure; for example, one part may be software and another part may be hardware. Further, the disclosure may be realized as a recording medium of a program controlling a system. Of course, the program recording medium may be considered to be a magnetic recording medium, a semiconductor memory, or any recording medium to be developed in the future in the same manner.

What is claimed is:

1. A printed material production system comprising:
   a first processor including
     a reception section configured to receive an order of a printed material, and
     when the order includes production of the three-dimensional printed material, an output section configured to output a first preview indicating views seen from a plurality of directions of the three-dimensional printed material after printing;
   a second processor including a production section configured to print in accordance with the order to produce the three-dimensional printed material; and
   a third processor including a print section that prints an order sheet including a preview per the printed material of the order, wherein
   when the order includes production of the three-dimensional printed material, and only one type of the three-dimensional printed material to be produced is included, the print section prints the first preview on the order sheet, whereas
   when the order includes production of more than one predetermined type of the three-dimensional printed material, the print section prints a second preview instead of the first preview of the predetermined three-dimensional printed material on the order sheet.

2. The printed material production system according to claim 1, wherein
   the second preview is a preview seen from one direction of the three-dimensional printed material.

3. The printed material production system according to claim 1, wherein
   the first preview is a development preview taken by developing the three-dimensional printed material.

4. A printing method comprising:
   receiving an order of a printed material;
   when the order includes production of the three-dimensional printed material, outputting a first preview indicating views seen from a plurality of directions of the three-dimensional printed material after printing;
   printing in accordance with the order to produce the three-dimensional printed material; and
   printing an order sheet including a preview per the printed material of the order, wherein when the order includes production of the three-dimensional printed material, and only one type of the three-dimensional printed material to be produced is included, the first preview is printed on the order sheet, whereas when the order includes production of more than one predetermined type of the three-dimensional printed material, a second preview instead of the first preview of the predetermined three-dimensional printed material is printed on the order sheet.

5. A non-transitory computer-readable storage medium storing a program, the program causing a computer to perform functions comprising:

a reception section configured to receive an order of a printed material;

when the order includes production of the three-dimensional printed material, an output section configured to output a first preview indicating views seen from a plurality of directions of the three-dimensional printed material after printing;

a production section configured to print in accordance with the order to produce the three-dimensional printed material; and a print section that prints an order sheet including a preview per the printed material of the order, wherein when the order includes production of the three-dimensional printed material, and only one type of the three-dimensional printed material to be produced is included, the print section prints the first preview on the order sheet, whereas when the order includes production of more than one predetermined type of the three-dimensional printed material, the print section prints a second preview instead of the first preview of the predetermined three-dimensional printed material on the order sheet.

* * * * *